United States Patent
Je et al.

(10) Patent No.: US 9,817,464 B2
(45) Date of Patent: Nov. 14, 2017

(54) PORTABLE DEVICE CONTROL METHOD USING AN ELECTRIC PEN AND PORTABLE DEVICE THEREOF

(71) Applicant: Samsung Electronics Co., Ltd, Gyeonggi-do (KR)

(72) Inventors: Seongmin Je, Gyeonggi-do (KR); Jiyoon Park, Gyeonggi-do (KR); Jaeyung Yeo, Gyeonggi-do (KR); Seungeun Lee, Seoul (KR)

(73) Assignee: Samsung Electronics co., Ltd., Suwon-si, Gyeonggi-do (KR)

(*) Notice: Subject to any disclaimer, the term of this patent is extended or adjusted under 35 U.S.C. 154(b) by 60 days.

(21) Appl. No.: 14/051,350

(22) Filed: Oct. 10, 2013

(65) Prior Publication Data
US 2014/0192031 A1    Jul. 10, 2014

(30) Foreign Application Priority Data

Jan. 7, 2013    (KR) .................. 10-2013-0001597

(51) Int. Cl.
| G06F 3/033 | (2013.01) |
| G06F 1/32 | (2006.01) |
| G06F 3/0354 | (2013.01) |
| G06F 3/041 | (2006.01) |

(52) U.S. Cl.
CPC ........ G06F 1/3218 (2013.01); G06F 3/03545 (2013.01); G06F 3/041 (2013.01)

(58) Field of Classification Search
CPC ..... G06F 1/3218; G06F 3/03545; G06F 3/041
USPC ................................................ 345/156–184
See application file for complete search history.

(56) References Cited

U.S. PATENT DOCUMENTS

| 5,396,443 A | 3/1995 | Mese et al. |
| 6,791,536 B2 | 9/2004 | Keely et al. |
| 7,653,883 B2 | 1/2010 | Hotelling et al. |
| 2004/0032399 A1 | 2/2004 | Sekiguchi et al. |
| 2004/0066367 A1* | 4/2004 | Fagard .......................... 345/156 |

(Continued)

FOREIGN PATENT DOCUMENTS

| EP | 2057527 | 5/2009 |
| EP | 2339432 A2 | 6/2011 |

(Continued)

OTHER PUBLICATIONS

International Search Report dated Apr. 24, 2014 in connection with International Application No. PCT/KR2013/012411; 3 pp.

(Continued)

*Primary Examiner* — Insa Sadio

(57) ABSTRACT

The present disclosure relates to a method of controlling a portable device using an electric pen, and a portable device thereof, and more particularly, to a method of controlling a portable device using an electric pen capable of controlling the portable device based on an interrupt event generated by a manipulation of the electric pen, and a portable device thereof.

The method includes controlling a portable device using an electric pen, including sensing an interrupt event by manipulation of the electric pen positioned in a area within a sensible distance of the electric pen, sensing separation of the electric pen from the area within the sensible distance, and performing a control operation of the portable device in response to the separation.

20 Claims, 6 Drawing Sheets

(56) References Cited

U.S. PATENT DOCUMENTS

| | | |
|---|---|---|
| 2006/0161871 A1 | 7/2006 | Hotelling et al. |
| 2007/0004452 A1* | 1/2007 | Yueh .................. 455/556.2 |
| 2007/0176909 A1 | 8/2007 | Pavlowski |
| 2008/0046425 A1 | 2/2008 | Perski |
| 2008/0158165 A1 | 7/2008 | Geaghan et al. |
| 2008/0225018 A1 | 9/2008 | Pang |
| 2009/0078474 A1 | 3/2009 | Fleck et al. |
| 2009/0115745 A1 | 5/2009 | Chuang et al. |
| 2009/0265670 A1 | 10/2009 | Kim et al. |
| 2011/0155479 A1 | 6/2011 | Oda et al. |
| 2011/0169775 A1 | 7/2011 | Liaw et al. |
| 2011/0304583 A1* | 12/2011 | Kruglick .................. 345/174 |
| 2012/0183099 A1 | 7/2012 | Harrat et al. |
| 2012/0194523 A1* | 8/2012 | Marggraff ........... G06F 3/03545 345/473 |
| 2012/0221870 A1* | 8/2012 | Zhao .................. G06F 1/1654 713/320 |
| 2012/0306738 A1* | 12/2012 | Yamashita ............. G06F 3/041 345/156 |
| 2012/0306927 A1* | 12/2012 | Lee et al. ...................... 345/660 |

FOREIGN PATENT DOCUMENTS

| | | |
|---|---|---|
| KR | 10-2012-0056465 | 6/2012 |
| WO | WO 2007037760 A1 | 4/2007 |

OTHER PUBLICATIONS

Extended European Search Report dated Feb. 13, 2015 in connection with European Patent Application No. 13193297.2; 12 pages.
European Examination Report dated Feb. 2, 2016 in connection with European Application No. 13193297.2, 7 pages.
European Patent Office, "Communication pursuant to Article 94(3) EPC," European Application No. 13193297.2-1959, Nov. 15, 2016, 11 pages, publisher EPO, Rijswijk, Netherlands.

\* cited by examiner

PORTABLE DEVICE CONTROL METHOD USING AN ELECTRIC PEN AND PORTABLE DEVICE THEREOF

CROSS-REFERENCE TO RELATED APPLICATION(S) AND CLAIM OF PRIORITY

The present application is related to and claims the benefit under 35 U.S.C. §119(a) of a Korean Patent Application filed on Jan. 7, 2013 in the Korean Intellectual Property Office and assigned Serial No. 10-2013-0001597, the entire disclosure of which is hereby incorporated by reference.

TECHNICAL FIELD

The present disclosure relates to a method of controlling a portable device using an electric pen, and a portable device thereof, and more particularly, to a method of controlling a portable device using an electric pen capable of controlling the portable device based on an interrupt event generated by a manipulation of the electric pen and a separation of the electric pen from a sensed range, and a portable device thereof.

BACKGROUND

A portable device has complex functions such as taking a picture or a video, replaying a music file or a video, playing a game, receiving a broadcast and supporting wireless Internet or the like, and is being implemented in the form of a general multimedia player. As such, the portable device is developed to a new form in terms of hardware or software in order to enhance portability and convenience while satisfying user desires.

As portable devices develop, there is an increasing need for configuring the portable device to enable an information input to easily control the portable device. In order to satisfy the need, a touch screen panel (TSP) has been developed as an input device capable of inputting information. The touch screen panel includes a display unit of the portable device so that the user may input desired information while looking at the display unit.

A touch screen panel is used in many portable devices, such as a smart phone and a tablet computer, or the like. The touch screen panel should be supplied a certain amount of power from the battery of the portable device, and thus if the touch screen panel is not efficiently controlled, the power of the portable device is quickly consumed.

SUMMARY

To address the above-discussed deficiencies, embodiments of the present disclosure provide a method of controlling a portable device using an electric pen capable of controlling the portable device based on an interrupt event generated by a manipulation of the electric pen and a separation of the electric pen from a sensed range, and a portable device thereof.

The electric pen permits a more elaborate input through the touch screen panel. The electric pen may provide a possibility of various usages such as a control of an efficient use of the touch screen panel, but, certain electric pens are just used as an auxiliary means for input and are not used for other purposes.

Certain embodiments of the present disclosure include a method of controlling a portable device using an electric pen includes: sensing an interrupt event by manipulation of the electric pen positioned in an area within a sensible distance of the electric pen; sensing separation of the electric pen from the area within the sensible distance; and performing a control operation of the portable device in response to the separation. The sensing of the interrupt event includes: sensing a touch or hovering operation of the electric pen; and sensing the interrupt event by the manipulation of the electric pen while the touch or hovering operation is sensed. The sensing of the touch or hovering operation includes: determining whether there is a control operation corresponding to the touch or hovering operation; and performing the control operation if there is the corresponding control operation. The sensing of the interrupt event includes: sensing a change of at least one of an electric signal and a magnetic signal by the touch or hovering operation of the electric pen; and sensing the interrupt event by a change of a frequency of at least one of the electric signal and the magnetic signal. The change of the frequency occurs by a manipulation of at least one of a button, a wheel, a dial and a switch of the electric pen. The sensing of the interrupt event includes: receiving a wireless signal including interrupt information from the electric pen; and sensing the interrupt event based on the interrupt information. The sensing of the interrupt event includes: sensing a user's input for generating an interrupt event; and sensing the interrupt event based on the user's input. The performing of the control operation includes: determining whether a preset time has passed after the separation of the electric pen; and performing the control operation if the preset time has passed. The performing of the control operation includes: terminating an application under operation; and displaying a standby screen or a home screen. The performing of the control operation includes: entering a locking mode; and displaying a locking screen as the portable device enters the locking mode. The performing of the control operation includes: storing or temporarily storing a working state of an application under operation. The performing of the control operation includes: turning off a power of at least one of components that constitute the portable device except an input sensing unit for sensing the electric pen. Certain embodiments of the present disclosure include a method of controlling a portable device using an electric pen further includes: sensing entrance of the electric pen into the area within the sensible distance by the input sensing unit; and turning on a power of at least one of components whose power has been turned off.

Certain embodiments of the present disclosure include a portable device includes: a display unit for displaying information; an input sensing unit for sensing an input of an electric pen on the information, that is, sensing at least one of an entrance of the electric pen into an area within a sensible distance, an interrupt event by a manipulation of the electric pen positioned in the area within the sensible distance, and a separation of the electric pen from the area within the sensible distance. The input sensing unit senses a frequency change of at least one of an electric signal and a magnetic signal by a touch or hovering operation of the electric pen, and senses the interrupt event by a frequency change of at least one of the electric signal and the magnetic signal. The frequency change occurs by a manipulation of at least one of a button, a wheel, a dial and a switch of the electric pen. Certain embodiments of the present disclosure include a portable device further includes: a communication unit for transmitting and receiving a wireless signal with the electric pen, wherein, if a wireless signal including interrupt information is received through the communication unit, the controller senses the interrupt event based on the interrupt information. Certain embodiments of the present disclosure include a portable device further includes: an input unit for sensing user input for generating an interrupt event, wherein the controller senses the interrupt event based on the user input. The controller performs at least one of an operation of controlling the display unit to terminate an application under operation and display a standby screen or a home screen, an operation of entering a locking mode and an operation of storing or temporarily storing a working state of the application under operation. The controller turns off at least one of components that constitute the portable device except the input sensing unit, and, if a re-entrance of the electric pen into the area within the sensible distance is sensed, the controller turns on a power of at least one of components whose power have been turned off.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile electronic device. Embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The present disclosure applies to a control of a portable device which senses a user input using an electric pen.

Further, the present disclosure relates to a portable device for sensing a user input using an electric pen, and can be applied to any device capable of sensing an input using an electric pen as well as a general electronic terminal such as a smart phone, a portable terminal, a mobile terminal, a personal digital assistant (PDA), a portable multimedia player (PMP), a notepad, a Wibro terminal and a tablet PC.

Hereinafter, the embodiments of the present disclosure will be described in detail with reference to the attached drawings.

Figure 1:
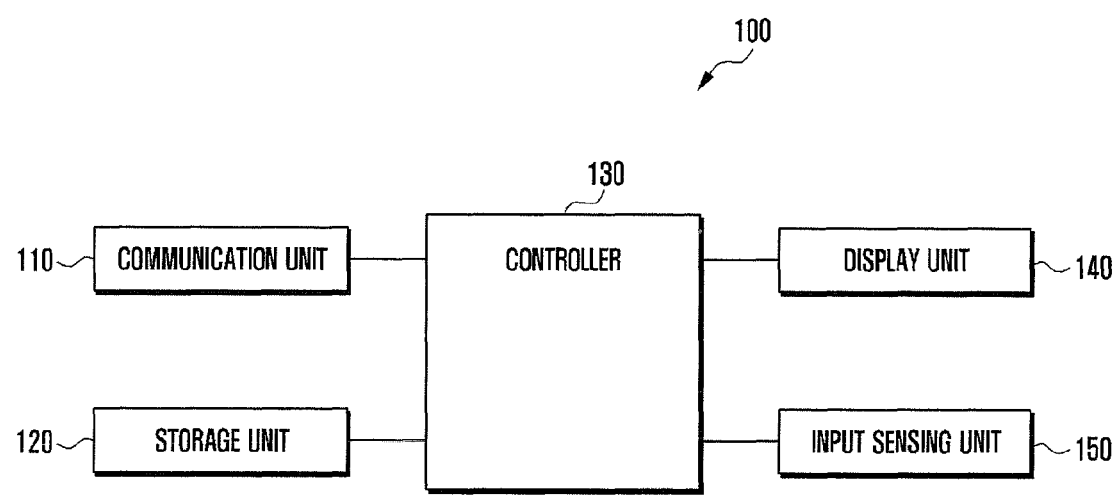
FIG. 1 illustrates a configuration of a portable device according to embodiments of the present disclosure.

FIG. 1 illustrates a configuration of a portable device according to embodiments of the present disclosure.

Referring to FIG. 1, a portable device 100 includes a communication unit 110, a storage unit 120, a controller 130, a display unit 140 and an input sensing unit 150.

The communication unit 110 performs data communication with external devices. The communication unit 110 can include a transmitter for up-converting and amplifying the frequency of the transmitted signal, and a receiver for low-noise-amplifying the received signal and down-converting the frequency. In certain embodiments, the communication unit 110 performs data communication using a light signal such as infrared rays, and the communication unit 110 can include an optical sensor and an infrared sensor, or the like.

According to certain embodiments of the present disclosure, the communication unit 110 performs wireless communication with the electric pen. The communication unit 110 transmits wireless signals to the electric pen. Further, the communication unit 110 receives wireless signals indicating a location of the electric pen, information of a distance to the electric pen, the manipulation state of the electric pen, and data stored in a storage unit included in the electric pen. In certain embodiments, the electric pen includes a communication module for transmitting and receiving wireless signals to and from the communication unit 110, an infrared rays transmission/reception unit or an on/off signal generation unit, or the like.

The storage unit 120 stores programs or commands for the portable device 100. The controller 130 executes programs or commands stored in the storage unit 120.

The storage unit 120 can include at least one of storage media such as a flash memory type, a hard disk drive type, a multimedia card micro type, a card type memory (e.g., SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

According to embodiments of the present disclosure, the storage unit 120 stores information on the electric field or critical size of the electric field, the critical frequency or critical resonance frequency for determining the electric pen's entrance within a sensing distance, a distance from the electric pen, separation of the electric pen, or the like.

Further, according to certain embodiments of the present disclosure, the storage unit 120 temporarily or permanently stores the working state of the portable device 100, the working state of the application operated in the portable device 100, data under operation, or the like under the control of the controller 130.

The controller 130 controls each component for overall operation performance of the portable device 100. For example, the controller 130 controls the portable device 100 based on an interrupt event by manipulation of the electric pen and separation from a sensed range of the electric pen.

According to embodiments of the present disclosure, after an interrupt event of the electric pen located within the sensible range, if separation from the sensible range is sensed, the controller 130 performs a control operation corresponding to the separation. For example, the controller 130 performs a control operation, such as a home screen display, a locking mode entrance, and storing of the working state of the application in response to the interrupt event and separation. Further, the controller 130 controls the portable device 100 to operate in a slip mode by turning off power of other components which have controlled the input sensing unit 150 in response to the interrupt event and separation.

The description of more specific operations of the controller 130 will be described in detail with reference to the attached drawings.

The display unit 140 displays information processed in the portable device 100. For example, the display unit 140 displays information corresponding to an application, program or service currently under operation along with a user interface (UI) or graphic user interface (GUI).

The display unit 140 can be implemented as a touch screen. The touch screen not only displays information, but also receives a user input on the displayed information.

The touch screen can include a touch panel attached as a bonding layer on an image display device. The image display device is a device for outputting an image, and can include a liquid crystal display (LCD), a plasma display panel (PDP), an electroluminescence (EL) or a cathode ray tube (CRT), or the like. The touch panel senses touch coordinates on an input of an object or a user's hand. The touch panel can use various schemes such as a resistive type, a capacitive type, an electromagnetic type, a surface acoustic wave type (SAW type), an infrared type, or the like. In case the touch panel is a capacitive type, an input by an electric pen including a conductive material or coil, or the like, which may cause electrostatic induction, as well as a human body.

A proximity input within a certain distance from the touch screen is sensed according to the implementation type.

The input sensing unit 150 senses an input using a change in an electric field or a magnetic field. Specifically, the input sensing unit 150 first forms an electric field or magnetic field, and then senses the size by the entrance of the electric pen, or the like into the electric field or magnetic field, and a change of the frequency or resonance frequency. At this time, the distance by which the electric field or magnetic field is formed from the portable device 100, that is, the distance up to which the user input is sensed, is referred to a sensing distance. The input sensing unit 150 generates input information including information on the location where the electric pen is sensed and information on the distance with the electric pen, and transmit the generated information to the controller 130.

In the certain embodiments of the present disclosure, the input sensing unit 150 is coupled with the display unit 140, and senses an input of the electric pen through the display unit 140. According to the present disclosure, the sensing distance means a distance by which the electric field or magnetic field is formed from the display unit 140.

The input sensing unit 150 is composed of a digitizer and a sensor board, or the like. The digitizer includes a resistive digitizer, a capacitive digitizer, or an electronic digitizer. The input sensing unit 150 is composed of several modules for sensing an input as well as a digitizer along with the technology development.

In the certain embodiments of the present disclosure, the input sensing unit 150 senses an input by the electric pen. The input sensing unit 150 senses entrance of the electric pen into a sensible range or separation of the electric pen from the sensible range. Further, the input sensing unit 150 senses an operation state of a button, wheel, dial, switch or the like, included in the electric pen. In addition, the portable device 100 further includes an input unit for sensing user input and a power supply unit for supplying power to each component.

The components illustrated in FIG. 1 make it possible to implement a portable device 100 having more or less components.

Below, a configuration of the controller 130, the display unit 140 and the input sensing unit 150 of the portable device 100 according to an embodiment of the present disclosure will be described in detail.

Figure 2:
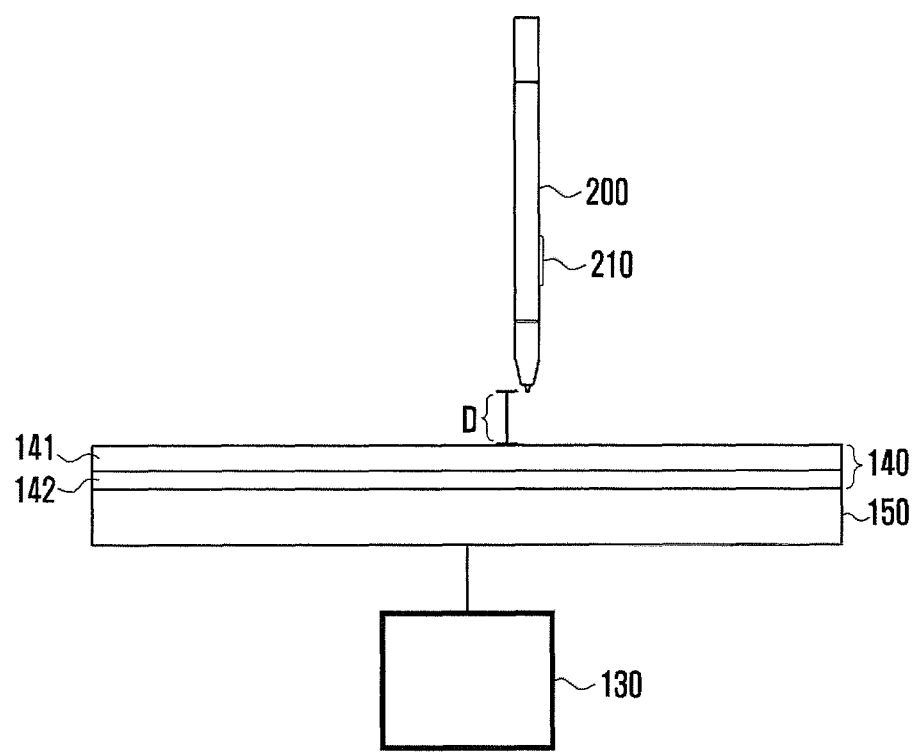
FIG. 2 illustrates components of a portable terminal according to the present disclosure.

FIG. 2 illustrates some components of a portable device according to the present disclosure. Referring to FIG. 2, the portable device 100 according to the present disclosure includes a controller 130, a display unit 140 and an input sensing unit 150. The display unit 140 displays information. The display unit 140 includes a window 141 and a liquid crystal layer 142.

The window 141 protects the liquid crystal layer 142 from an external impact or foreign particles. The window 141 can include plastic lens such as PMMA or reinforced high-strength special glass. A touch sensor, a proximity sensor or a pressure sensor, or the like can be attached on the window 141 to sense a user input. In certain embodiments, the sensor is attached on the window 141 in the form of a pad.

The liquid layer 142 includes liquid crystal molecules having the attributes of both liquid and a solid. The liquid crystal layer 142 controls the arrangement state by supplying electric current to the liquid crystal molecules so as to display a picture, letter or number, or the like. A transparent electrode is connected to the liquid crystal layer 142, and includes a plurality of polarized light filters which are vertically formed.

An insulation layer is coupled with at least one of the window 141 or the liquid crystal layer 142. The insulation layer can be a separate layer between the window 141 and the liquid crystal layer 142.

The input sensing unit 150 is positioned at the bottom of the display unit 140. The input sensing unit 150 senses an input by the electric pen 200. The input sensing unit 150 includes a digitizer, a sensor board, or the like. The digitizer can be a resistive digitizer, a capacitive digitizer or an electronic digitizer. The input sensing unit 150 includes several modules for sensing an input as well as a digitizer along with the technology development.

The input sensing unit 150 includes a plurality of sensors in the form of a net so that the change of the electric field or magnetic field can be sensed. The change of the electric field or magnetic field by the electric pen 200 is sensed through the sensor. In this case, the electric pen 200 includes conductive materials (e.g., a magnet) of a coil for inducing a change of the electric field or magnetic field with the display unit 140.

The input sensing unit 150 senses entrance into an area within a sensible distance D or separation from the area within the sensible distance D. Further, the input sensing unit 150 senses a distance from the display unit 140 to the electric pen 200 within the sensible distance D by the electric field or magnetic field variance. As such, the input sensing unit 150 senses a touch or hovering operation of the electric pen 200.

In the certain embodiments of the present disclosure, the input sensing unit 150 senses an manipulation state of a button, a wheel, a dial or a switch, or the like included in the electric pen 200. FIG. 2 illustrates an example of an electric pen 200 having a button 210. The electric pen 200 induces a change in a surrounding electric field or magnetic field by a change of an internal capacitance value according to the manipulation state of the button 210, namely, the pushed state of the button 210. As such, the input sensing unit 150 senses a change of the electric field or magnetic field by the manipulation state of the button 210 included in the electric pen 200.

The input sensing unit 150 is coupled with the liquid crystal layer 142, and is positioned between the window 141 and the liquid crystal layer 142.

If the electric pen 200 is sensed, the input sensing unit 150 generates a signal corresponding to the state of the sensed electric pen 200, and transmits the signal to the controller 130. The controller 130 controls various operations of the portable device 100 based on the signal received from the input sensing unit 140.

The drawing of the portable device 100 shown in FIG. 2 is one form for implementing an embodiment of the present disclosure, and the portable device 100 can have various forms or structures.

Hereinafter, a method of controlling the portable device 100 according to the present disclosure will be described in detail.

Figure 3:
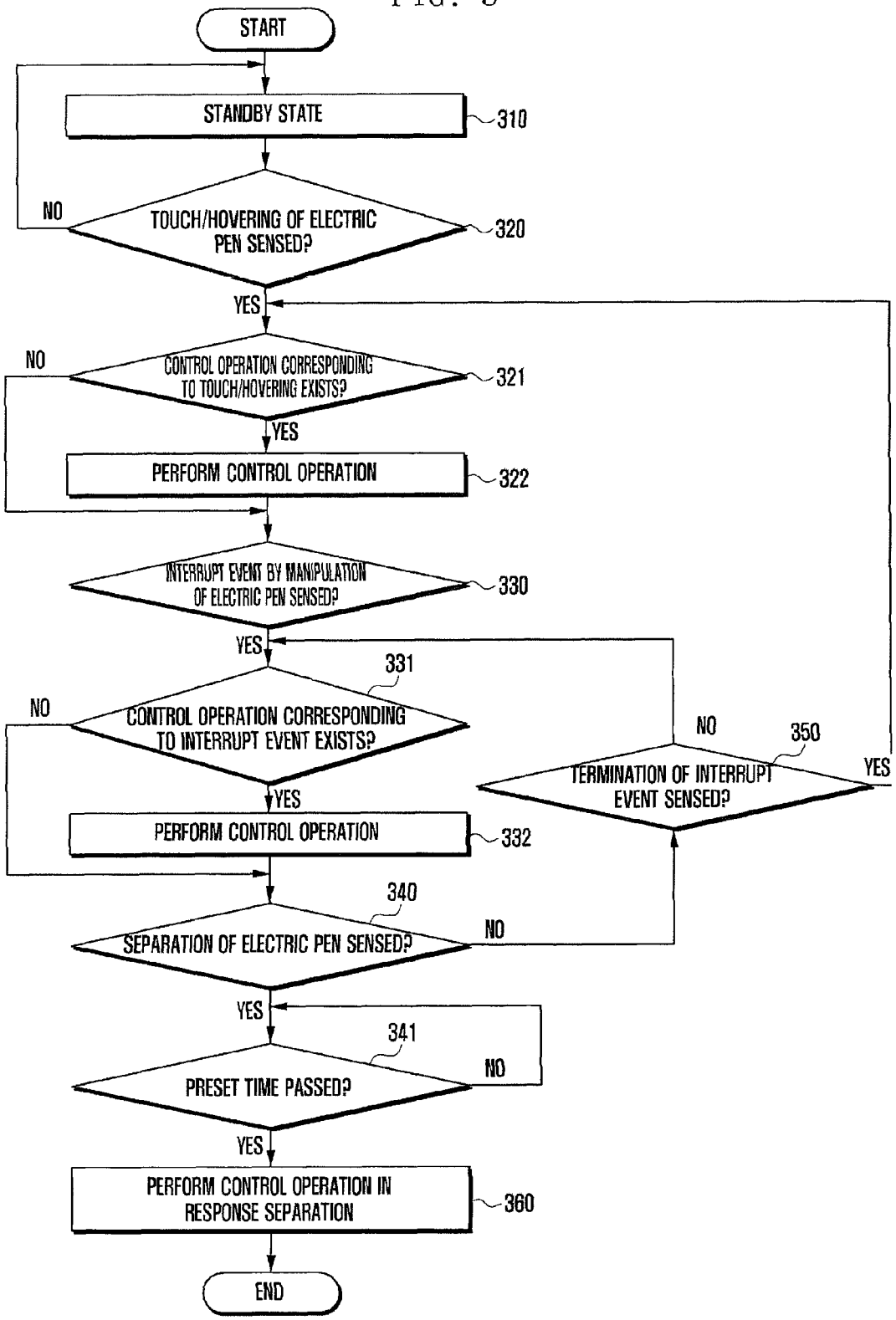
FIG. 3 illustrates a method of controlling a portable device according to embodiments of the present disclosure.

FIG. 3 illustrates a method of controlling a portable device according to embodiments of the present disclosure. Hereinafter, an example of performing, by the controller 130, several operations of the portable device 100 using the electric pen 200 will be described, but the present disclosure is not limited thereto, and may be applicable to various applications, programs, services or functions executable in the portable device 100.

First, the controller 130 operates in a standby state in block 310.

In the standby state, the controller 130 operates in a locking mode and a standby mode. Further, in the standby state, the controller 130 performs the operation of an arbitrary application, program or service. The controller 130 controls the display unit 140 to display a locking screen, a standby screen or a screen corresponding to an application being operated in the standby state.

Next, the controller 130 determines whether a touch or hovering of the electric pen 200 is sensed in block 320.

The controller 130 determines whether the electric pen 200 is sensed through the input sensing unit 150.

Figure 4:
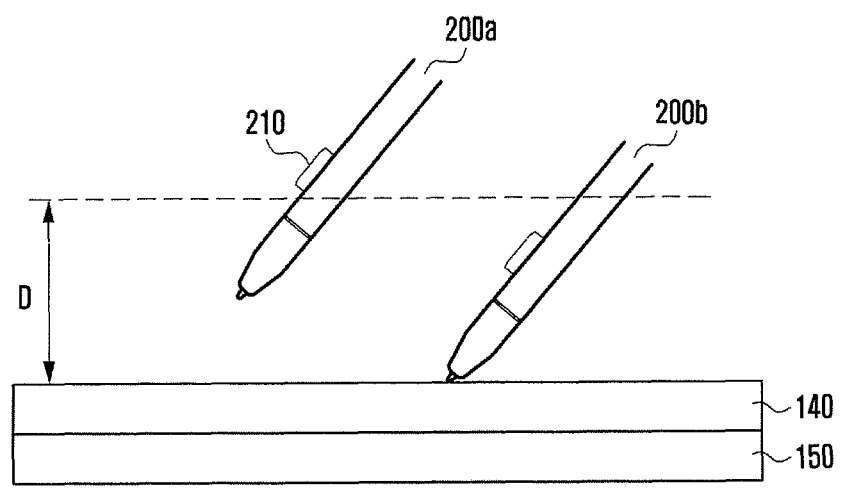
FIG. 4 illustrates a hovering and touch operation of an electric pen within a sensing range of a portable device according to embodiments of the present disclosure.

Referring to FIG. 4, the input sensing unit 150 senses a change of the magnetic field (or electric field) as the electric pen 200 enters an area within the sensible distance D. The input sensing unit 150 senses the entrance of the electric pen 200 into an area within the sensible distance D by the change of the intensity of the magnetic field or the change of frequency or resonance frequency. In certain embodiments, the electric pen 200 includes a conductive material or coil to induce a change in the electric field or magnetic field.

The input sensing unit 150 senses the distance from the portable device 100 to the electric pen 200 according to the variance of the magnetic field. For example, the input sensing unit 150 senses whether the electric pen 200 performs the hovering operation in a state where the electric pen 200 is positioned adjacent to the display unit 140 in an area within the sensible distance D (the electric pen 200 shown in FIG. 4 as electric pen 200a) or whether the electric pen 200 performs a touch operation in a state where the electric pen 200 contacts the display unit 140 (the electric pen 200 shown in FIG. 4 as electric pen 200b).

Figure 6:
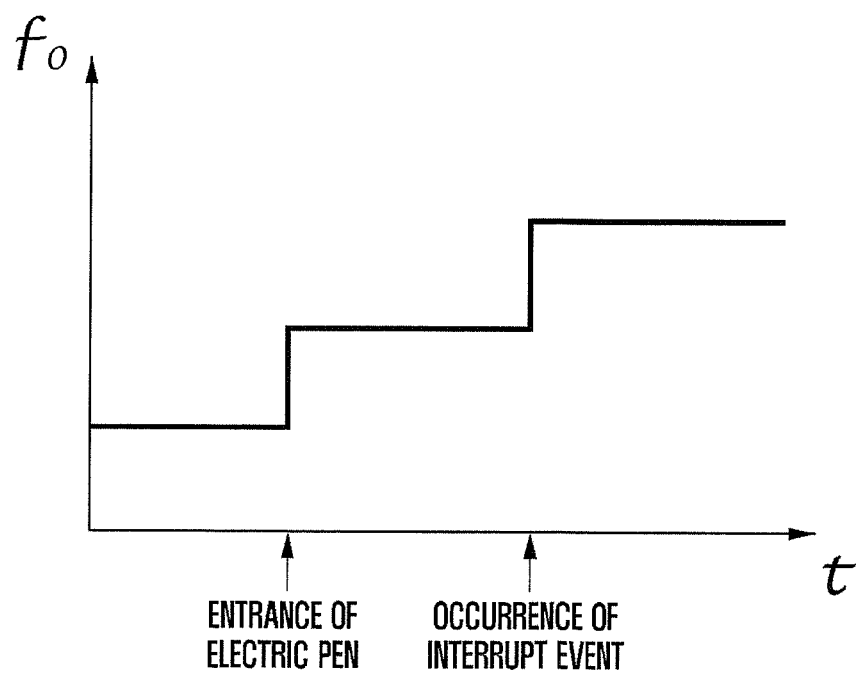
FIG. 6 illustrates a graph of a resonance frequency change sensed in an input sensing unit according to embodiments of the present disclosure.

Referring to FIG. 6, as the electric pen 200 enters an area within the sensible distance D, the resonance frequency of the magnetic field sensed in the input sensing unit 150 is changed. Here, the resonance frequency changes according to the size of a magnet included in the electric pen 200, the distance between the magnet and the input sensing unit 150, or the number of times coiled of the coil, or the like. FIG. 6 illustrates an example in which, when an electric pen 200 enters an area within the sensible distance D and maintains a certain distance with the input sensing unit 150, the resonance frequency of the electric field or magnetic field sensed in the input sensing unit 150 rises.

The input sensing unit 150 generates a signal including information on the change of the electric field or magnetic field, information of an allocation where an input has been sensed, information of a distance between the display unit 140 and the electric pen 200, or the like, and transmits the signal to the controller 130.

The controller 130 determines whether the electric pen 200 has entered an area within the sensible distance D or a touch or hovering by the electric pen 200 has been sensed, based on the signal transmitted from the input sensing unit 150.

Further, the controller 130 determines whether the electric pen 200 has been sensed through the communication unit 110.

The communication unit 110 communicates wirelessly with the electric pen 200. The communication unit 110 receives a wireless signal including information on the position of the electric pen 200 and the distance with the electric pen 200, or the like, from the electric pen 200. Here, the electric pen 200 includes a communication module for transmitting and receiving a wireless signal with the portable device 100, an infrared rays transmission and reception unit or an on/off signal generation unit, or the like. The communication unit transmits the received wireless signal to the controller 130. The controller 130 determines whether the electric pen 200 has approached an area within the sensible distance D, or a hovering operation or touch operation of the electric pen 200.

In the certain embodiments of the present disclosure, the controller 130 senses an entrance, touch or hovering of the electric pen 200, but the present disclosure is not limited thereto, and can sense an input of a coupled form of various operations such as a drag, drop and motion, or the like.

Further, in the certain embodiments of the present disclosure, the controller 130 senses the electric pen 200 through the communication unit 110 or the input sensing unit 150, but the present invention is not limited thereto, and various technologies, algorithms and apparatus for recognizing the electric pen 200 are used according to development of the technology.

If a touch or hovering is not sensed, the controller 130 returns to the standby state to repeatedly perform a control operation according to the present disclosure.

If a touch or hovering is sensed, the controller 130 determines whether there is a control operation corresponding to the touch or hovering in block 321.

The controller 130 determines whether there is a control operation of the portable device 100 corresponding to the touch or hovering operation of the sensed electric pen 200. The controller 130 determines corresponding control operation based on the sensed position and sensed time of the electric pen 200, and the sensing of linked operation, or the like. Further, the controller 130 determines a control operation corresponding to a touch or hovering operation based on the application currently under operation.

The control operation corresponding to the touch or hovering operation can be set by user or can be preset at the time of manufacturing the portable device 100 and be stored in the storage unit 120.

If there is a control operation corresponding to the touch or hovering, the controller 130 performs the control operation in block 322.

The controller 130 controls various components of the portable device 100 to perform control operation corresponding to the touch or hovering. The control operation can be a selection of a certain menu, function, file or the like, an operation of a certain application, a performance of various functions provided in an application, file viewing, playing of media file, a termination of an application, or the like. The controller 130 controls the storage unit 130 to store data or control the display unit 140 to display information according to the control operation.

Next, the controller 130 determines whether an interrupt event by the manipulation of the electric pen is sensed in block 330.

Figure 5:
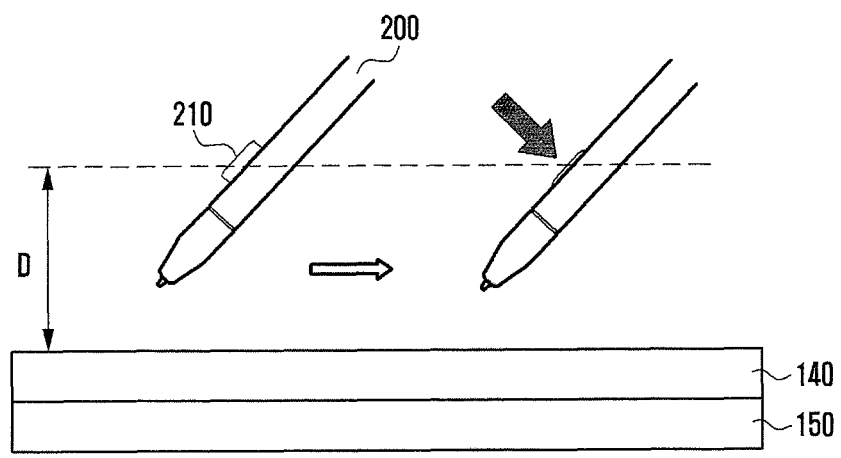
FIG. 5 illustrates an example of an interrupt event by a button manipulation of an electric pen by a portable device according to embodiments of the present disclosure.

The interrupt event occurs by a manipulation such as a button, wheel, dial or switch, or the like included in the electric pen 200. For example, the interrupt event occurs when a button 210 included in the electric pen 200 is pushed as illustrated in FIG. 5.

Further, in the certain embodiments of the present disclosure, an interrupt event occurs by the manipulation of the input unit included in the portable device 100. That is, the interrupt event occurs by the manipulation of a button, switch, jog dial, or the like included in the portable device 100 by user. Further, the interrupt event is sensed by generating, by user, a user's input through the display unit 140 implemented as a touch screen. The controller 130 determines whether the interrupt event has been sensed based on whether a user input corresponding to the interrupt event has occurred through the input unit or the touch screen.

The interrupt event can be an event that changes the magnetic field around the electric pen 200 by changing a capacitance or inductance inside the electric pen 200. The button 210, or the like included in the electric pen 200 is connected to a variable capacitor or variable inductor of the circuit inside the electric pen 200. If the button 210 is manipulated, the change in the surrounding electric field or magnetic field is induced by changing the capacitance or inductance inside the electric pen 200. The change in the electric field or magnetic field can be a change of the intensity of the electric field or magnetic field, or a change of a vector, frequency or resonance frequency, or the like.

In certain embodiments, the controller 130 determines whether an interrupt event has been sensed based on the change of the electric field or magnetic field sensed in the input sensing unit 150.

Referring to FIG. 6, the resonance frequency of the electric field or magnetic field around the portable device 100 sensed in the input sensing unit 150 is changed for the first time as the electric pen 200 enters an area within the sensible distance D. At this time, the resonance frequency changes according to the size of a magnet included in the electric pen 200, the distance between the magnet and the input sensing unit 150, or the number of times of the coiled coil included in the electric pen 200, or the like. FIG. 6 illustrates an example in which the resonance frequency of the electric field or magnetic field sensed in the input sensing unit 150 rises in case the input sensing unit 150 maintains a certain distance with the electric pen 200 after the electric pen 200 enters an area within the sensible distance D.

In the state in which the electric pen 200 is positioned in an area within the sensible distance D, if an interrupt event occurs, the resonance frequency of the electric field or magnetic field around the portable device 100 sensed in the input sensing unit 150 changes for the second time FIG. 6 illustrates an example in which the resonance frequency rises according to the manipulation of the button 210 included in the electric pen 200. The input sensing unit 150 senses an occurrence of an interrupt event according to the second change of the resonance frequency.

Further, the interrupt event is an event in which the communication module of the electric pen 200, the infrared rays transmission and reception unit or on/off signal generation unit generate a wireless signal and transmit the signal to externally. Specifically, if the pen button 210, or the like included in the electric pen 200 is manipulated, the communication module of the electric pen 200, the infrared rays transmission and reception unit or on/off signal generation unit generate a wireless signal and transmit the wireless signal to the communication unit 110 of the portable device 100.

In this case, the controller 130 determines whether an interrupt event has been sensed based on the wireless signal received through the communication unit 110. The controller 130 determines whether an interrupt event has been sensed based on interrupt information included in the received wireless signal.

If the interrupt event is sensed, the controller 130 determines whether there is a control operation corresponding to the interrupt event in block 331.

The controller 130 determines whether there is a control operation of the portable device 100 corresponding to the interrupt event. The controller 130 determines a corresponding control operation based on the type of the interrupt event (e.g., a click of a button, a dial rotation, or the like), a location where the interrupt event has been sensed, whether a touch or hovering operation has been performed, or whether a drag operation has been linked, or the like. Further, the controller 130 determines a control operation corresponding to the interrupt event based on the application currently under operation.

The control operation corresponding to the interrupt event can be set by user, or can be preset at the time of manufacturing the portable device 100 and be stored in the storage unit 120.

If there is a control operation corresponding to the interrupt event, the controller 130 performs the control operation in block 332.

The controller 130 controls various components of the portable device 100 to perform control operation corresponding to the interrupt event. The control operation, for example, may be an operation of various functions provided in the application, such as a display of a menu, a display of a previous or next screen, a conversion of a writing mode, or the like. The controller 130 controls the storage unit 120 to store data or control the display unit 140 to display information according to the control operation.

Next, the controller 130 determines whether separation of the electric pen 200 has been sensed in block 340.

Figure 7:
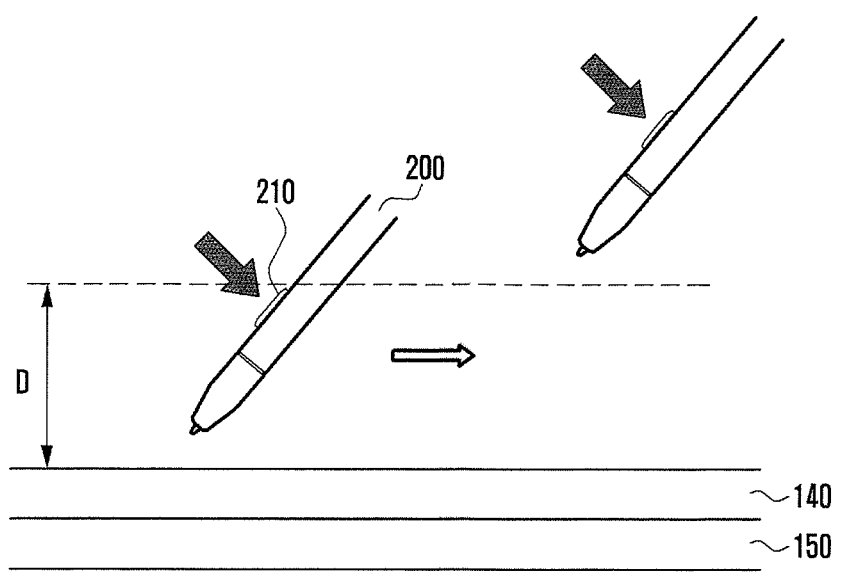
FIG. 7 illustrates an example of separation of an electric pen from a sensed range of a portable device according to embodiments of the present disclosure.

As illustrated in FIG. 7, in a state in which an interrupt event has been sensed, the controller 130 determines whether separation of the electric pen 200 from an area within the sensible distance D is sensed.

The controller 130 determines whether the electric pen 200 has been separated through the input sensing unit 150. Specifically, the input sensing unit 150 senses a change of the electric field or magnetic field by separation of the electric pen 200 from an area within the sensible distance D. The change of the electric field or magnetic field can be a change of at least one of the intensity of the electric field or magnetic field, or a change of a vector, frequency or resonance frequency, or the like. The input sensing unit 150 generates a signal including information on a change of the electric field or magnetic field, information of a location where the separation has been sensed, or the like according to the separation of the electric pen 200. The controller 130 determines whether the electric pen 200 is separated from an area within the sensible distance D based on the signal transmitted from the input sensing unit 150.

Further, the controller 130 determines whether the electric pen 200 has been separated through the communication unit 110. Specifically, the communication unit 110 communicates wirelessly with the communication module of the electric pen 200, the infrared rays transmission and reception unit or on/off signal generation unit, or the like. The communication unit 110 receives information including whether the electric pen 200 has been separated from an area within the sensible distance D, from the electric pen 200 through wireless communication. The communication unit 110 transmits a received wireless signal to the controller 130. The controller 130 analyzes a wireless signal, and determines whether the electric pen 200 has been separated from an area within the sensible distance D.

If separation of the electric pen has not been sensed, the controller 130 determines whether termination of the interrupt event has been sensed in block 350.

The controller 130 determines whether termination of an interrupt event has been sensed through the input sensing unit 150 or the communication unit 110. The interrupt event can be returned to the original state of the manipulated electric pen 200 or be terminated by a separate manipulation.

If it is determined that an interrupt event has been terminated, the controller 130 returns to block 321 determining whether there is a control operation corresponding to a touch or hovering so as to repeat the control operation according to the present disclosure.

If it is sensed that the electric field or magnetic field returns to a state before an occurrence of the interrupt event through the input sensing unit 150, the controller 130 determines that the interrupt event has been terminated. Further, in case a wireless signal including information on the interrupt termination has been received through the communication unit 110, the controller 130 determines that the interrupt event has been terminated.

If it is determined that the interrupt event has been terminated, the controller 130 returns to determining whether there is a control operation corresponding to the touch or hovering according to the present disclosure so as to repeat the control operation according to the present disclosure.

In contrast, if it is determined that the interrupt event has not been terminated, the controller 130 returns to block 331 determining whether there is a control operation corresponding to the interrupt event so as to repeat the control operation according to the present disclosure.

Further, if separation of the electric pen is sensed, the controller 130 determines whether a preset time has passed in block 341.

The controller 130 determines whether the preset time has passed from the time when separation of the electric pen 200 has been sensed. For example, the preset time can be a time which becomes a criterion for determining whether the control of the portable device 100 using the electric pen 200 has been terminated. The preset time can be set by user or at the time of manufacturing the portable device 100 and be stored in the storage unit 150.

If the preset time does not pass, the controller 130 repeatedly determines whether the preset time has passed.

If the preset time has passed, the controller 130 performs the control operation in response to the separation of the electric pen 200 in block 360.

In a state in which the interrupt event has been sensed, as the electric pen 200 is separated from an area within the sensible distance D, the controller 130 performs a control operation corresponding to the separation of the electric pen 200.

The control operation corresponding to the separation of the electric pen 200 can be set by user or be set at the time of manufacturing the portable device 100 and stored in the storage unit 140.

If necessary, the controller 130 determines an on/off mode of the control operation according to the present disclosure. The controller 130 sets the on/off mode based on whether to control the operation of the portable device 100 according to the interrupt event of the electric pen 200 or separation of the electric pen 200 from an area within the sensible distance D. The controller 130 controls the display unit 160 to display a user interface for setting on/off mode, or receives an input of the mode setting through an input unit or a touch screen. The controller 130 sets the on/off mode in response to the input, and stores the set points in the storage unit 140. In this case, the controller 130 determines whether the control operation of the portable device 100 according to the present disclosure has been set at the on mode.

The controller 130 terminates the application currently under operation in response to the separation of the electric pen 200. The controller 130 determines what the application under operation in the foreground is, and terminates the application. At this time, the controller 130 can completely terminate the operation of the application in the process so that the application does not operate in the background.

The controller 130 can temporarily or permanently store the working state of the application under operation in the storage unit 120 so that the data in use is not lost along with the termination of the operation of the application. Accordingly, the controller 130 stores the working state of the application under operation in the background as well as the application under operation in the foreground in the storage unit 120. For example, in the case in which generation of an interrupt event and separation of the electric pen 200 are sensed while a memo is written in the memo function application, the controller 130 temporarily or permanently stores memo data being written.

Further, the controller 130 controls the display unit 140 to display a standby screen, home screen, background screen, locking screen and a power save mode screen, or the like in response to separation of the electric pen 200. That is, the controller 130 controls the display unit 140 to remove the screen of the application under operation in the foreground and display a standby screen, or the like. At this time, the controller 130 controls the application under operation in the foreground to be terminated in the process or to operate in the background. Further, the controller 130 controls the components of the portable device 100 to operate at the locking mode or power save mode according to the displayed screen.

The controller 130 temporarily or permanently store the working state of the application under operation in the storage unit 120 in order to prevent a data loss which occurs as the operation state of the application is converted into the background or the operation state of the portable device 10 is converted into the locking mode or power save mode in response to the separation of the electric pen 200.

In addition, the controller 130 performs various operations such as a function execution or mode setting of the portable device 100 in response to the separation of the electric pen 200.

According to certain embodiments of the present disclosure, the controller 130 turns off at least one component which constitutes the portable device 100 except the input sensing unit 150. That is, the controller 130 controls the power supply unit to stop power supply to the remaining components other than the input sensing unit 150. As such, the portable device 100 operates at a power save mode or slip mode.

The controller 130 temporarily or permanently stores the working state of components before the power is turned off in the storage unit 120. The controller 130 stores information of the application under operation before the power is turned off, information on the working state for each application, information of data under operation, or the like in the storage unit 120.

In the state in which the power for components other than the input sensing unit 150 is turned off, the controller 130 determines whether the electric pen 200 enters an area within the sensible distance D. The controller 130 determines whether the change in the electric field or magnetic field is sensed through the input sensing unit 150 of which power has not been turned off. The method of sensing the electric pen 200 through the input sensing unit 150 has already been described above.

In response to the entrance to an area within the sensible distance D of the electric pen 200 sensed by the input sensing unit 150, the controller 130 turns on the power of the components of which power has been turned off. That is, the controller 130 controls the power supply unit to supply power to components, which constitute the portable device 100, so as to cancel the power save mode or slip mode. The controller 130 controls each component of the portable device 100 to return to the working state before the power of the component is turned off. The controller 130 controls each component of the portable device to display the work under operation or to play a file being played, based on the information on the working state stored before the power is turned off.

Above, some control operations corresponding to separation of the electric pen 200 have been illustrated, but the present disclosure is not limited thereto, and may be applicable to various control operations within the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of controlling a portable device using an electric pen, the method comprising:
   establishing a wireless communication between the portable device and the electric pen;
   generating a first event in response to detecting, via the wireless communication, an input on a button of the electric pen, if the electric pen is hovering over the portable device under a distance less than a threshold from the portable device;
   performing a first control operation corresponding to the first event, the first control operation being associated with an application executed currently, the first control operation including a conversion to a writing mode;
   generating a second event in response to detecting the distance between the electric pen and the portable device exceeds the threshold while the input on the button of the electric pen is maintained; and
   in response to generating the second event, after generating the first event, performing a second control operation corresponding to the second event of the portable device, the second control operation comprising a conversion from the writing mode.

2. The method of claim 1, wherein generating the first event comprises:
   sensing one of: a touch and a hovering operation of the electric pen; and
   generating the first event by the input of the electric pen while one of: the touch and the hovering operation is sensed.

3. The method of claim 2, further comprising:
   determining whether there is a second control operation corresponding to the one of: the touch and the hovering operation; and
   in response to the determining of the second control operation, performing the second control operation.

4. The method of claim 1, wherein generating the first event comprises:
   sensing a change of at least one of an electric signal and a magnetic signal by one of: a touch and a hovering operation of the electric pen; and
   generating the first event by a change of a frequency of at least one of the electric signal and the magnetic signal.

5. The method of claim 4, wherein the change of the frequency occurs by an input of at least one of the button, a wheel, a dial or a switch of the electric pen.

6. The method of claim 1, wherein generating the first event comprises:
   receiving a wireless signal including interrupt information from the electric pen; and
   generating the first event based on the interrupt information.

7. The method of claim 1, wherein generating the first event comprises:
   sensing a user input for generating an interrupt event; and
   generating the first event based on the user input.

8. The method of claim 1, wherein the performing of the first control operation comprises:
   determining whether a preset time has passed after the distance between the electric pen and the portable device exceeded the threshold; and
   in response to the preset time passing, performing the first control operation.

9. The method of claim 1, wherein the performing of the first control operation comprises:
    terminating an application under operation; and
    displaying a standby screen or a home screen.

10. The method of claim 1, wherein the performing of the first control operation comprises:
    entering a locking mode; and
    displaying a locking screen as the portable device enters the locking mode.

11. The method of claim 1, wherein the performing of the first control operation comprises:
    storing or temporarily storing a working state of an application under operation.

12. The method of claim 1, wherein the performing of the first control operation comprises:
    turning off a power of at least one of components of the portable device except an input sensor for sensing the electric pen.

13. The method of claim 12, further comprising:
    after turning of the power to the at least one of components, sensing the distance between the electric pen and the portable device being less than the threshold; and
    turning on a power of at least one of components that had power turned off.

14. A portable device comprising:
    a display configured to display information;
    a controller configured to:
    generate a first event in response to detecting an input on a button of a electric pen, if the electric pen is hovering over the portable device under a distance less than a threshold from the portable device;
    perform a first control operation corresponding to the first event, the first control operation being associated with an application executed currently, the first control operation including a conversion to a writing mode;
    generate a second event in response to detecting the distance between the electric pen and the portable device exceeds the threshold while the input on the button of the electric pen is maintained; and
    in response to generating the second event after generating the first event, perform a second control operation corresponding to the second event of the portable device, the second control operation comprising a conversion from the writing mode.

15. The portable device of claim 14, further comprising an input sensor is configured to sense a frequency change of at least one of an electric signal and a magnetic signal by one of: a touch and a hovering operation of the electric pen, and to sense the first event by a frequency change of at least one of the electric signal and the magnetic signal.

16. The portable device of claim 15, wherein the frequency change occurs by the input on at least one of the button, a wheel, a dial or a switch of the electric pen.

17. The portable device of claim 14, further comprising:
    a transmitter configured to transmit and a receiver configured to receive a wireless signal with the electric pen,
    wherein, the controller is configured to:
    in response to receiving a wireless signal including interrupt information through the receiver, generate the first event based on the interrupt information.

18. The portable device of claim 14, further comprising:
    an input sensor configured to sense a user input for generating an interrupt event,
    wherein the controller is further configured to generate the first event based on the user input.

19. The portable device of claim 14, wherein the controller is configured to perform at least one of:
    an operation of controlling the display to terminate an application under operation, and to display at least one of a standby screen and a home screen,
    an operation of entering a locking mode, and an operation of at least one of storing and temporarily storing a working state of the application under operation.

20. The portable device of claim 14, wherein the controller is further configured to:
    turn off at least one of components of the portable device except an input sensor, and
    in response to a sensing the distance between the electric pen and the portable device is less than the threshold, turn on a power of at least one of components that had power turned off.

* * * * *